April 10, 1956 F. W. BROOKS 2,741,335
BRAKE SHOE ANCHOR
Filed Aug. 9, 1950 3 Sheets-Sheet 2

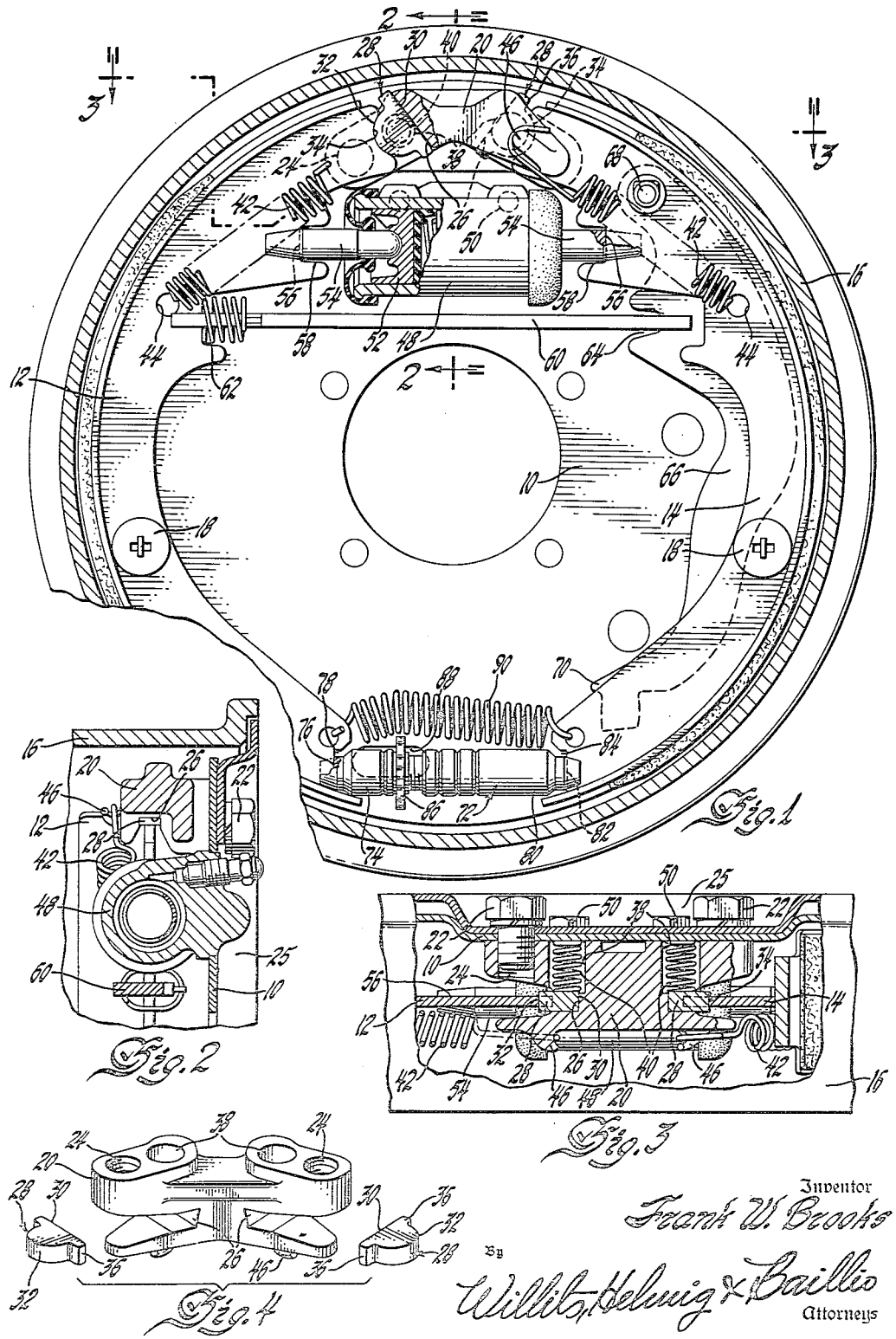

Inventor
Frank W. Brooks
By
Willits, Helmig & Baillio
Attorneys

April 10, 1956 F. W. BROOKS 2,741,335
BRAKE SHOE ANCHOR
Filed Aug. 9, 1950 3 Sheets-Sheet 3
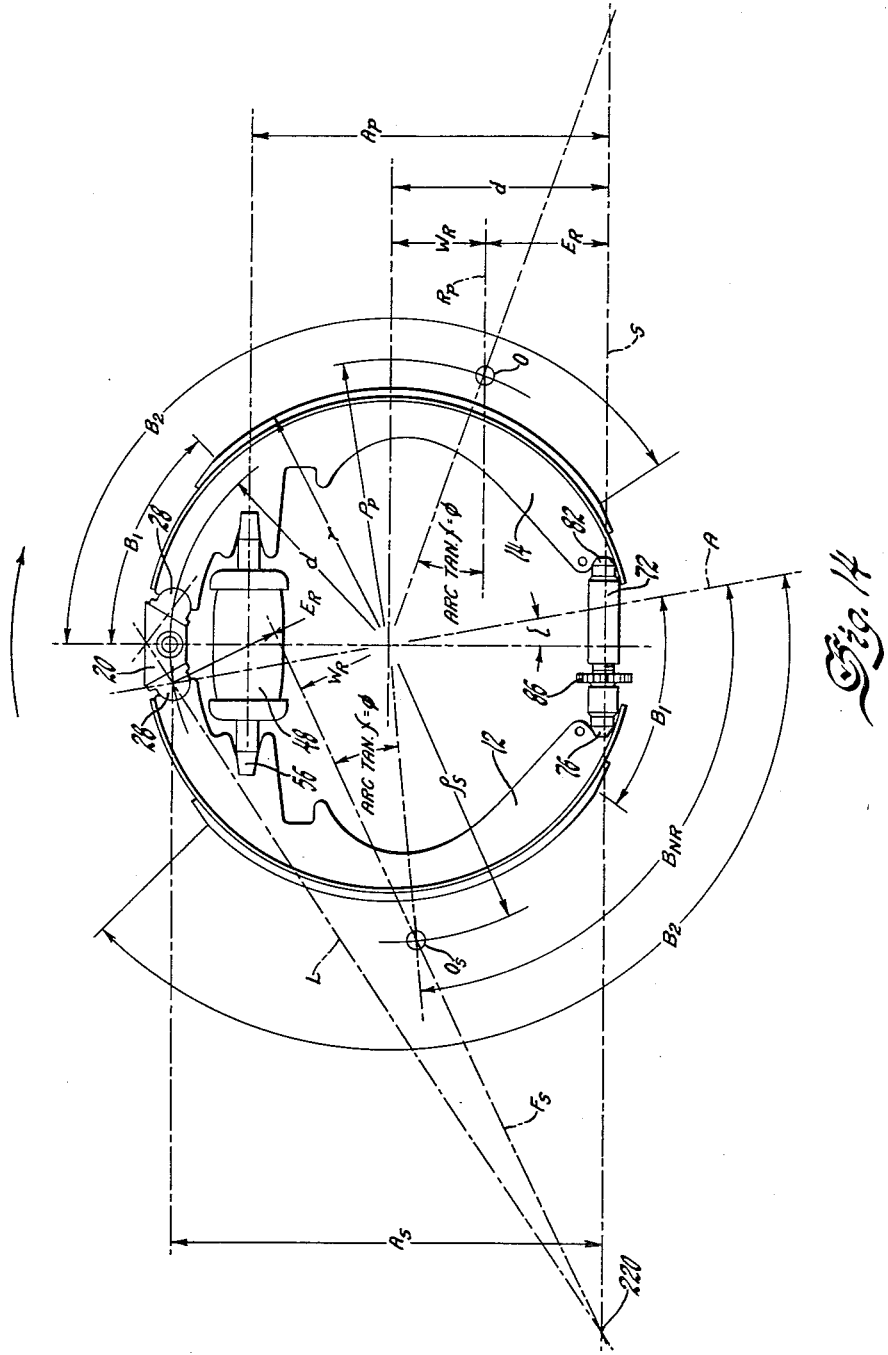
Inventor
Frank W. Brooks
By Willets, Helmig & Baillio
Attorneys United States Patent Office 2,741,335
Patented Apr. 10, 1956

2,741,335

BRAKE SHOE ANCHOR

Frank W. Brooks, Dayton, Ohio, assignor to General Motors Corporation, Detroit, Mich., a corporation of Delaware Application August 9, 1950, Serial No. 178,530

17 Claims. (Cl. 188—78)

This invention relates to an improved brake and particularly to an improved automatic centering device for brake shoes.

The invention is illustrated on a hydraulically actuated two-shoe servo type brake. In this type of brake the actuating and supporting or anchorage means are located between one opposed pair of ends of the brake shoes. The other opposed pair of ends are merely connected by an adjusting strut that is supported by the shoes and is free of the backing plate. The anchorage has a pair of opposed slots each facing a brake shoe and positioned in alignment with the brake shoe webs. A slipper to provide a pivot for each brake shoe is slidably positioned in each of these slots. The slippers have a flat face engaging the flat and angularly disposed base of the slot in the anchorage to provide a sliding connection between the slipper and anchorage. The other face of the slipper is curved and engages a curved recess in the end of the brake shoe web to provide a pivotal connection between the slipper and the shoe. The base of the slot in the slipper provides a sliding surface and is positioned perpendicularly to the brake shoe load line extending through the pivot axis between the brake shoe and the sliding slipper. The sliding slipper is normally held from sliding in the slot in the anchor by a transverse spring which increases the load and thus the friction on a side surface of the anchor. When the load line of the brake shoe moves sufficiently due to the eccentric relation of the brake shoe and drum, the sliding slipper will move to correct the eccentricity. The slipper is held in the slot by the retraction springs attached to the shoes and the anchor.

A modified form of anchor made of a plurality of stamped sheets is built up in the form of a laminated structure. The sliding slipper slides in a grooved slot so that it cannot fall out of the slot. The brake shoe has pivotal contact with an arcuate portion of the sliding slipper. Retraction springs attached to the brakes are secured to the sliding slippers at the axis of the pivot between the slipper and brake shoe. A spring is positioned in a recess in the anchor to normally hold the anchor in position in the slot to maintain concentricity between the drum and shoes but to allow movement when the drum and shoes are eccentrically related.

The primary object of the invention is to provide an improved sliding anchorage for a two-shoe servo brake in order to automatically adjust the position of the brake shoes to maintain the proper concentric relation between the brake shoes and the drum.

Another object of the invention is to provide an improved anchorage to automatically adjust the concentricity of two-shoe servo type brakes having a sliding surface positioned at right angles to the normal load line of the brake shoe extending through the pivot of the brake shoe on the anchor.

Another object of the invention is to provide in a sliding anchorage for automatic concentricity adjustments of the brake shoes relative to the drums of a two-shoe servo brake a groove to prevent nonlinear movement of the sliding slipper relative to the anchor.

Another object of the invention is to provide in a sliding anchorage for automatic concentricity adjustments of the brake shoes relative to the brake drum of a two-shoe servo brake a sliding slipper bearing on a flat portion on the anchor, a shoe pivotally connected to said slipper and a retraction spring connecting said shoe and said slipper.

These and other objects of the invention are more fully explained in the following drawings and specification showing a preferred embodiment of the invention.

In the drawings:

Figure 1 is a general elevation of the brake with parts in section.

Figure 2 is a partial sectional view of Figure 1 on the lines 2—2.

Figure 3 is a partial sectional view of Figure 1 on the lines 3—3.

Figure 4 is a disassembled perspective view of the anchor and the sliding slippers.

Figure 14 is a diagrammatic view showing the brake force analysis.

Figure 5:
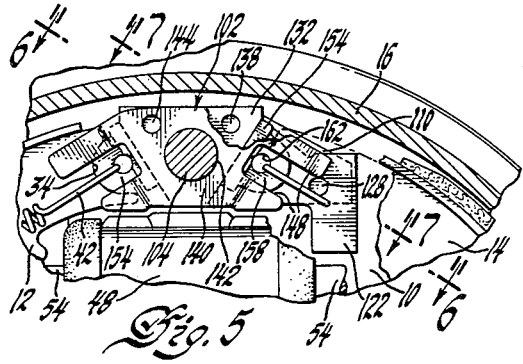
Figure 5 is a partial elevation view of a brake showing a modified anchor.

The automatic centering brake is mounted on a backing plate 10 which may be mounted on an axle (not shown) in the conventional manner. The brake shoes 12 and 14 with lining material attached in a suitable manner are moved by the actuating means into engagement with the drum 16 and resiliently held against the backing plate by the spring guides 18.

The shoe assembly is supported and centered by the automatic adjustable anchor located between a pair of meeting ends of the brake shoes. The adjustable anchorage mechanism is supported on an anchor block 20 which is secured to the backing plate 10 by bolts 22 which are threaded into threaded holes 24. The backing plate 10 has an annular reinforcement 25 providing a double thickness for the bolts 22. The anchor block 20 is cut away on each side to provide a pair of opposed slots 26 for the sliding slippers 28 extending transversely across the block from the inside to the outside edge. The slippers have a flat face 30 engaging the flat surface at the bottom of the recess 26 and a semicircular side 32 to engage a curved recess 34 in the end of each brake shoe. As best shown in Figure 4, the flat side 30 is longer than the base of curve 32 forming a projection 36 at each end of the slipper. These projections make the slipper more stable and prevent the ends of the brake shoe engaging and scoring the base of slot 26 when the slipper slides transversely of the anchor.

The anchor block 20 has a pair of apertures 38 between the slots 26 and the backing plate which open into the portion of the side of slots 26 at the center of the base of the slots. Coil springs 40 are positioned in the apertures and are compressed between the backing plate 10 and the sliding slipper to frictionally load the slipper and prevent displacement under normal brake operation. The brake shoes 12 and 14 and the slippers 28 are held against the anchor block by retraction springs 42 which are hooked in apertures 44 in the side of the brake shoes and projections 46 on the anchor block.

The actuating or wheel cylinder 48 is located immediately below the anchor block and secured to the backing plate by suitable bolts 50. The wheel cylinder has pistons 52 with seats engaging the free struts 54. The other end of each of the struts 54 has a slot 56 engaging the brake shoe toe at a positioning recess 58. The manual actuation of the brake for emergency or parking is accomplished by an emergency strut 60 pivoted to brake shoe 12 in the recess 62. The other end of strut 60 pivotally engages recess 64 located between the ends of actuating lever 66 to provide a pivot connection between strut 60 and lever 66. The lever 66 is pivoted by pin 68 at the upper end to the brake shoe 14 and the other end 70 has suitable means for connection to an operating cable (not shown).

An adjusting strut 72 is located between the other pair of ends of the brake shoes 12 and 14. The adjusting strut consists of a sleeve 74 having a slotted end 76 engaging a recess 78 in the end of brake shoe 12 and a threaded sleeve 80 with a slotted end 82 engaging a recess 84 in the end of brake shoe 14 and a threaded turnbuckle screw with a serrated actuating wheel 86. The turnbuckle screw is threaded into sleeve 80 and rotatably fitted into sleeve 74 and may be turned to adjust the distance between the ends of the brake shoes to provide an adjustment for lining wear. This adjustment is made by inserting a tool through aperture 88 in the backing plate. A spring 90 is hooked into suitable apertures in the ends of the shoes 12 and 14 to hold the shoes together, to support the adjustable strut and to engage the serrated wheel 86 to hold the wheel in adjusted position.

A modified form of anchor block formed from a plurality of stamped plates is illustrated in Figures 5 to 13. The arrangement of the basic brake elements in this modification is shown only in part since it is substantially the same as the brake illustrated in Figure 1. Figure 5 shows a backing plate 10 and the cylindrical brake drum 16 of a conventional automotive type of brake. The brake shoes 12 and 14 are mounted in the same manner and have an anchor at the top between the opposed ends and a floating link connection at their opposed ends as shown in Figure 1. A wheel cylinder 48 is located adjacent the anchorage at the top of the brake as shown in the drawing and a pair of piston rods 54 operated by the wheel cylinder 48 engage the brake shoes 12 and 14 as is more clearly shown in Figure 1. The laminated anchor assembly 102 is located above the wheel cylinder 48 and between the adjacent end of the brake shoes 12 and 14. The anchor assembly is secured to the backing plate 10 by a suitable bolt 104 passing through central apertures in each of the laminations of the anchor assembly 102 and through suitable apertures in the backing plate 10 and a reinforcing plate 106 located on the backing plate in this region. A nut 108 threaded on the bolt 104 clamps the laminated anchor assembly 102 together and to the backing plate 10.

Figure 10:
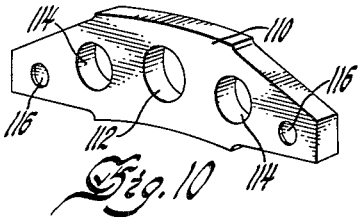
Figure 10 is a perspective view showing another lamina of the laminated anchorage.

The anchor assembly 102 consists of two base laminations 110 one of which is clearly shown in perspective in Figure 10. Each of the base laminations 110 has a central aperture 112 for the bolt 104 and a pair of apertures 114 to provide a portion of spring recesses or wells symmetrically arranged about the center of the base laminations. At each end of the base laminations 110 the metal is pressed to form a recess 116 on the front face and a cylindrical projection 118 on the rear face. The first lamination 110 is positioned against backing plate 10 which has an aperture 120 positioned to receive the projection 118 and thus locate the first lamination 110 on the backing plate. A second lamination 110 is positioned on top of the first lamination with the projections 118 on the second lamination extending into the recess 116 of the first lamination in order to lock the parts against a lateral movement. A third lamination or inner guide plate 122 is illustrated in the detail perspective view in Figure 9. The inner guide plate 122 has a central aperture 124 for the bolt 104 and a pair of apertures 126 symmetrically located about the center of the plate 122 to provide a portion of the spring wells. The inner guide plate 122 has a cylindrical projection 128 adjacent each end. Inner guide plate 122 is positioned on top of the second base plate 110 and the projection 128 enters into the recess 116 and locks the plate against lateral movement.

The inner guide plate 122 has a pair of locating apertures 130 located adjacent the center of the plate and above the bolt aperture 124. The anchor plate 132 which is illustrated in detail in perspective view Figure 8 has a generally trapezoidal shape. An aperture 134 is located substantially in the center of the anchor plate 132 for the bolt 104. The outer face of the anchor plate is pressed inwardly to provide a pair of cylindrical recesses 136 on the outer face and a pair of projections 138 on the inner face thereof. The anchor plate 132 is positioned on the outer face of the inner guide plate 122 with the cylindrical projections 138 extending into the apertures 130 of the guide plate 122. The sloping sides of the trapezoidal anchor plate 132 are flat to provide a sliding bearing surface 139.

Figure 6:
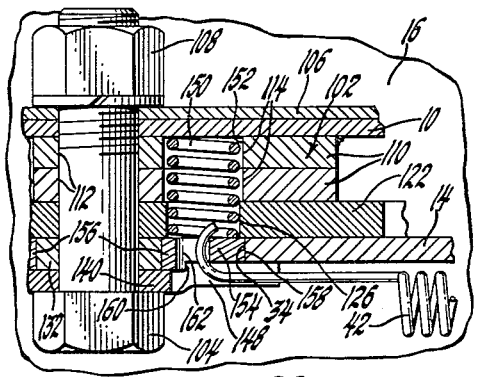
Figure 6 is a partial enlarged section on the line 6—6 of Figure 5.
Figure 7:
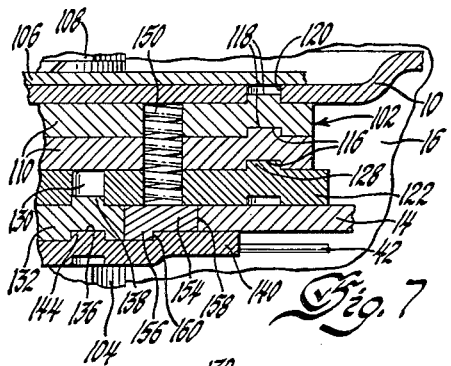
Figure 7 is a partial enlarged section on line 7—7 of Figure 5.
Figure 8:
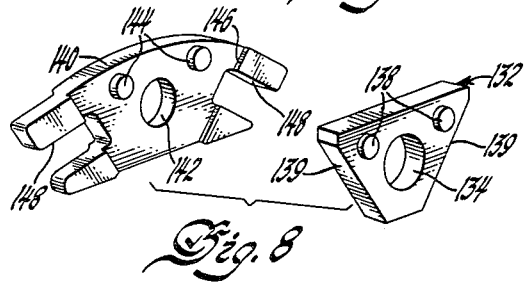
Figure 8 is a perspective view showing two laminae of the laminated anchorage.
Figure 9:
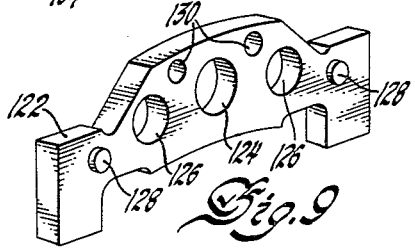
Figure 9 is a perspective view showing another lamina of the laminated anchorage.

An outer guide plate 140 which is best illustrated in Figure 8 is then positioned on top of the anchor plate 132. The outer guide plate 140 has a central aperture 142 for the bolt 104 and a pair of inwardly extending cylindrical projections 144 located adjacent the center so that they will extend into the recess 136 in the anchor plate 132. The outer guide plate 140 has symmetrically arranged on each side of the center a shoulder 146 which is parallel to the inclined face or bearing surface 139 of the trapezoidal anchor plate 132. The offset portion of the anchor plate 140 beyond the shoulder 146 has a recess 148 extending inwardly just beyond the shoulder 146. The recess 148 in effect provides on each end of the outer guide plate 140 a pair of tongues. As best shown in Figure 7, the outer guide plate which has the recesses 146 on the inner face is positioned on the anchor plate 132. The projections 144 on the outer guide plate 140 extend into the recesses 136 on the outer face of the anchor plate to laterally secure the assembly in position. A coil spring 150 is positioned in each spring well 152 which is formed by the apertures 114 in the two base laminations 110 and the aperture 126 in the inner guide lamination 122. The spring engages the backing plate 10 at its inner end and engages an anchor slipper 154 at its outer end. The laminations are shown secured together by the bolt 104 and the locating projections and recesses. Suitable spot or tack welding may be used as the sole or additional securing means between the backing plate and the laminations. Tack welds between the first lamination and the backing plate are illustrated in Figures 6 and 11 of the drawings.

Figures 12, 13:
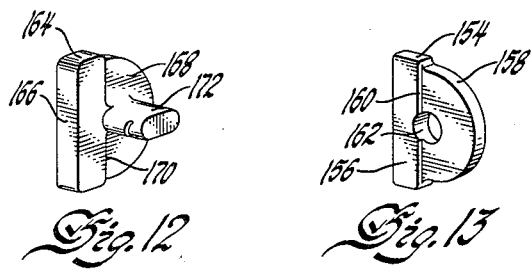
Figure 12 is an enlarged perspective of the modified slipper.
Figure 13 is an enlarged perspective of the slipper in the modified anchorage.

The anchor slipper 154 which is best illustrated in Figure 13 consists of a heavy rectangular base portion 156 and a thinner semi-cylindrical bearing portion 158. The thinner semi-cylindrical portion 158 is flush with one side of the integral rectangular base 156 to provide a shoulder 160 on the other side. An aperture 162 is provided substantially at the center of the semi-cylindrical portion 158. The slipper 154 is positioned in the slot in the laminated anchor block 102 between the inner guide plate 122 and the outer guide plate 140. The free long edge of the block portion 156 of the slipper provides a bearing surface which engages the sloped side or bearing surface 139 of the trapezoidal anchor plate 132 and the shoulder 160 of the slipper engages the shoulder 146 of the outer guide plate 140. Thus the slipper is retained in sliding relation with the anchor plate by the interengagement of the shoulder 160 on the slipper and the shoulder 146 on the outer guide plate 140. The brake shoes 12 and 14 have a substantially semi-cylindrical recess 34 in each of the upper ends which engage the edge of the semi-cylindrical portion 158 of the slipper 154. The brake shoe springs 42 are anchored to the web of each brake shoe by a hook portion which extends into aperture 44 in the brake shoe web. The other end of the spring 42 has a similar hook portion which extends inwardly through the aperture 162 in the slipper 154.

Figure 11:
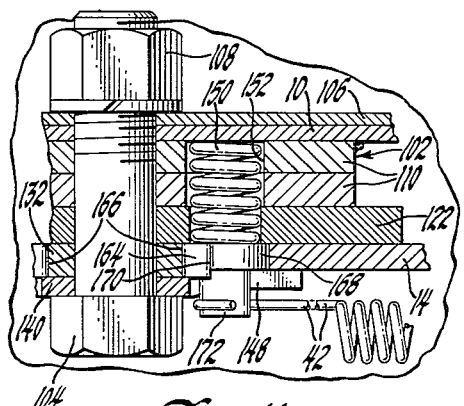
Figure 11 is a partial enlarged section showing a modified slipper.

In Figures 11 and 12 the laminated anchor 102 is illustrated with a modified slipper. It will be noted that several plates forming the laminated anchorage are formed in the same manner as illustrated in Figures 5 to 10. The slipper 164 is shown in detail in Figure 12 and consists of a rectangular base portion 166 with a thinner semi-circular portion 168 extending from the long edge of the rectangular portion. It will be noted that the thinner semi-circular portion 168 is flush with one side of the block 166 to provide a shoulder 170 between the block and semi-circular portions. Substantially at the center of the semi-cylindrical portion 168 a stud 172 is attached. The stud 172 extends perpendicular to the slipper 164 and provides anchorage for the hook on the end of the retraction springs 42. As pointed out above the other end of the spring 42 is hooked into aperture 44 in the brake shoe web. The spring 150 also engages the bottom face of the slipper 164 to frictionally retain it in the adjusting position within the anchorage 102.

The brake illustrated in Figure 1 has two floated brake shoes 12 and 14 mounted on the anchorage 20 at the top of the brake backing plate 10. A wheel cylinder 48 is secured to the backing plate 10 just below the anchorage 20 to expand the brake shoes and hold them in engagement with the brake drum 16. At the lower portion of the brake, an adjustable strut 72 connects the ends in the brake shoes. When a braking force is applied to expand the pistons 52 in the wheel cylinder 48 while the brake drum 16 is moving counterclockwise, the primary brake shoe 12 engages the brake drum and is moved counterclockwise to impose a servo force through strut 72 on the brake shoe 14. The brake shoe 14 has a rounded recess 34 at the upper end which engages the curved surface 32 of the slipper 28 and thus the brake shoe 14 pivots about the anchorage. The slipper is frictionally retained in position by means of the spring 40 which engages the flat side of the anchorage. If during this braking operation, it is necessary to move the pivot point of shoe 14 in order to obtain uniform engagement between the brake shoe and brake drum, the slipper 28 in contact with shoe 14 will slide in the recess 26 to properly adjust the pivot point. It is also pointed out that this adjustment is referred to as the concentricity adjustment. Uneven brake pressures are often caused by a lack of concentricity between the brake shoe and the drum. If the brake shoes and the drum are not concentric the pressures will be unequal and the slipper will slide to locate the shoes concentric with the drum. When the brake drum rotates counterclockwise, the shoe 12 is moved with the drum and thus separated from the anchorage 20. The slipper 28 normally in contact with the shoe 12 is disengaged from the shoe but is frictionally retained in the recess 26 by the spring 40. When the brakes are released the retraction springs 42 will return the brake shoes 12 and 14 to their normal centered position. The recesses 34 at the upper end of each brake shoe will engage the semi-circular portion 32 of the slippers 28. Thus during each application of the brakes the slipper in engagement with the secondary shoe will correct for any lack of concentricity between the shoes and drum by moving to provide the proper pivot point for concentrically mounting the shoes in relation to the drum. Thus upon release of the brakes, the retraction springs 42 will move the brakes to a proper free position. The operation of the brake for reverse braking will be similar. The brake drum will move in a clockwise direction and the brake shoe 14 will be in the primary shoe and brake shoe 12 will be the secondary shoe.

In general, the operation of the brake and the automatic centering device shown in Figures 5 to 13 is similar but there are several improved features. In these modifications the anchor block has a laminated construction consisting of a number of plates secured together by a bolt or other suitable means. The sliding slipper is slidably retained in the slot by the interengagement of shoulder 146 on the outer guide plate 140 and the shoulder 160 on the slipper. Thus the slipper can only move transversely of the brake shoe. A spring 150 mounted in the anchor engages the back side of the slipper 154 to frictionally retain the slipper in the slot in the anchorage. The retraction spring 42 which has a hook extending through the hole 162 in the slipper 154 not only resiliently holds the brake shoe in contact with the slipper but the hook portion limits the lateral sliding movement of the slipper. If the slipper moves too much, the hook portion of spring 42 will engage the tongue portions of plate 140 on either side of the recesses 148. The retraction spring 42 holds the brake shoe recess 34 in engagement with the rounded portion 158 of the slipper rather than directly with the anchor in the first modification. The slipper is retained in the recess in the anchor by the interengagement of the shoulders 146 and 160 on the anchor and slipper respectively. Thus the retraction spring anchorage 162 is slidably held on the anchor and maintains the same angular relationship with the brake shoe during all stages of adjustment. In this way the retraction spring force is maintained but it has no effect to move the concentricity adjustment.

A slipper 164 with a stud providing a spring anchor is illustrated in Figures 11 and 12. The stud 172 on the anchor 164 provides both an anchor for the spring 42 and limits the lateral sliding movement of the slipper by engagement with the tongues of plate 140 on either side of the recess 148. The slippers are also frictionally retained in adjusting position by a spring 150 and otherwise function similarly to the above modification.

The sloping surface on the anchor should be located so that the forces acting on the secondary brake shoe during normal brake actuation will not tend to shift the sliding slipper. The forces acting on the secondary brake shoe will not move the slipper if the resultant force on the brake shoe acting through the center of the brake shoe pivot is perpendicular to the flat surface of the anchor. The force vectors for a brake of this type are illustrated in Figure 14. Since the slope of the flat anchor surface is determined by the direction of the force, it is not necessary to determine the magnitude of the force for this purpose.

The brake is diagrammatically shown in Figure 14. The direction of drum rotation is indicated by the arrow at the top of the figure which extends in a clockwise direction. The primary shoe 14 and the secondary shoe 12 are connected together at the bottom by the strut 72 and hang as a unit from the fixed anchorage 20 at the top. Adjacent the anchorage 20 a wheel cylinder 48 has a pair of pistons which expand the brake shoes to apply the brakes.

The primary brake shoe has a lining having a toe end located from the vertical axis of the brake by the angle $B_1$ and having a heel end which is located from the vertical axis of the brake by the angle $B_2$. The radius of the curve which is assumed to be the locus of the points at which the resultant of all frictional and normal forces act is determined from the equation—

$$P = \frac{rE}{\sqrt{A^2 + B^2}}$$

in which $$r = \text{radius of lining}$$

$$E = \int_{B_1}^{B_2} \sin B \text{ and } B$$

$$A = \int_{B_1}^{B_2} \sin B \cos B \text{ and } B$$

$$B = \int_{B_1}^{B_2} \sin B \text{ and } B$$

When the proper values for the primary shoe are substituted in the above equation, the value of the radius $P_p$ is found and the locus may be drawn in as shown in Figure 14. Then the origin point O is located by drawing the line at an angle $\phi$ equal to natural tangent (arc tangent $f = \phi$) of the coefficient of friction for the particular brake lining and drum material used with the horizontal and through the locus drawn at radius $P_p$. The horizontal line $R_p$ represents the resultant of the normal and frictional forces. The horizontal line S at the base of the brake extends through the strut 72 and represents the direction of the force transmitted from one brake shoe to the other by the strut 72. The perpendicular distance between the line of action of the force exerted by the wheel cylinder and the adjusting strut load line S or the lever arm through which the wheel cylinder force acts on the primary brake shoe is represented by the distance $A_p$. The resultant of the normal and frictional forces $R_p$ acts at a lever arm WR when the center of the drum is the center of rotation and at a lever arm ER when the strut 72 is the center of rotation.

Since the anchor 20 for the secondary shoe 12 is located to the left of the vertical axis of the brake, the anchor line or base line A which passes through the anchor pivot and the center of the brake makes an angle 1 with the vertical axis. The toe end of the lining on the secondary shoe 12 is located by the angle $B_1$ with reference to the lower end of the anchor line A. Similarly the heel end of the lining is located by the angle $B_2$. Employing the above equation for P the locus of points at which the resultant of all frictional and normal forces act, the value of P is determining for the secondary shoe and the arc $P_s$ is drawn. Then the origin point $O_s$ for the secondary shoe is located by solving the equation for BNR—

$$\sin BNR = \frac{B}{\sqrt{A^2 + B^2}}$$

The values of A and B are the same as above. The angle BNR is laid off and the point $O_s$ located. Then the line $F_s$ through the origin point and at the angle $\phi$ whose natural tangent is the coefficient friction (arc tangent $f$) for the lining and drum with the line through the origin and the brake center is drawn. This line indicates the resultant force vector of the summation of the horizontal and vertical forces acting between the brake shoe and the drum. The distance $A_s$ represents the lever arm through which the strut force S acts on the secondary shoe 12 when it pivots on the sliding slipper 28. The lever arm of the resultant force vector $F_s$ when the rotation is about the center of the brake drum is the lever arm WR for the secondary shoe and when the rotation is about the pivot on slipper 28 the lever is ER for the secondary shoe. This line $F_s$ meets the line S representing the force through the strut 72 at the point 220. The line S represents the direction of the vector force which is transmitted from the primary shoe 14 to the secondary shoe 12. The line L extending from the point 220 to the center of the anchor pivot represents the direction of the vector force acting on the anchor. The bearing surface of anchor 20 on which the sliding slipper 28 moves is made perpendicular to the load line L so that the braking forces normally do not exert a force to move the slipper. The slipper is moved only when the slipper and thus the pivot point is not properly located to position the brake shoes concentric with the drum and there is a force perpendicular to the load line L which will move the slipper 28 on the anchor block 20.

While several illustrative embodiments of the invention have been described in detail, it will be appreciated that many modifications may be made within the scope of the appended claims.

What is claimed is:

1. In a brake, a brake shoe, an anchor for said brake shoe, sliding means slidably mounted on said anchor and pivotally engaging said brake shoe, said means sliding transversely of said anchor and in a direction substantially perpendicular to the brake shoe force vector acting on said anchor, and means mounted directly on said anchor and engaging said sliding means to restrain the sliding movement of the sliding means and means mounted directly on said anchor and engaging said sliding means to limit the sliding movement of said sliding means.

2. In a brake, a brake shoe, an anchor for said brake shoe, means slidably mounted on said anchor and pivotally engaging said brake shoe, said means sliding transversely of said anchor and in a direction substantially perpendicular to the brake shoe force vector acting on said anchor, and means mounted directly on said anchor and engaging said slidably mounted means to frictionally hold said slidably mounted means when acted upon by the small transverse forces during normal braking and insufficient to hold said slidably mounted means when acted upon by the large transverse forces during brake operation when the shoes are eccentric to the drum.

3. A brake comprising brake shoes arranged with the opposed ends facing each other, an anchor between said opposed ends, said anchor comprising a plurality of laminations secured to each other in fixed relation, one of said intermediate laminations having end surfaces and being smaller than the adjacent laminations to provide opposed angularly related slots, means slidably mounted in said slots and engaging said end surfaces and pivotally engaging said opposed ends, and interengaging means on said laminations to prevent lateral displacement.

4. A brake comprising, a pair of brake shoes arranged with the opposed ends facing each other, a fixed anchor between one pair of opposed ends, said anchor having opposed angularly related slots having a base and side wall, means slidably mounted in each of said slots in engagement with the base of said slot and pivotally engaging said one pair of opposed ends, a spring frictionally holding said means against the side wall of said slots, a force transmitting strut between the other pair of opposed ends, and means to apply said brakes positioned between said one pair of opposed ends adjacent said anchor.

5. In a brake, a pair of brake shoes, an anchor for one end of one of said brake shoes, pivot means slidably mounted on said anchor and engaging and pivoting said one brake shoe, guide means securing said pivot means to said anchor for transverse sliding movement, and a retraction spring directly connected to said one shoe and said sliding pivot means to keep said shoe in contact with said pivot means.

6. In a brake, a pair of brake shoes, a laminated anchor for one end of one of said brake shoes, one of said laminations having a flat edge within the edge of adjacent laminations to provide a slot, pivot means engaging and pivoting said one brake shoe, guide means securing said pivot means in said slot in said anchor and permitting transverse sliding movement, and a retraction spring connecting said one shoe and said pivot means to keep said shoe in contact with said pivot means.

7. In a brake, a pair of brake shoes, an anchor for one end of one of said brake shoes, pivot means engaging and pivoting said one brake shoe, guide means securing said pivot means to said anchor and permitting transverse sliding movement to move the brake shoe pivot means to adjust the brakes, resilient means in said anchor and engaging said pivot means to frictionally hold said pivot means, and a retraction spring connecting said one shoe and said pivot means to keep said shoe in contact with said pivot means.

8. In a brake, a pair of brake shoes, an anchor for one end of one of said brake shoes, pivot means engaging and pivoting said one brake shoe, guide means securing said pivot means to said anchor and permitting transverse sliding movement, said transverse sliding movement being perpendicular to the load vector of said brake shoe passing through said pivot means, and a retraction spring connecting said one shoe and said pivot means to keep said shoe in contact with said pivot means.

9. A brake shoe anchor comprising a plurality of laminations, said laminations being rigidly secured together with the faces in contact, one of said laminations being shorter than the adjacent lamination to provide a slot and having an end surface within said slot, and a sliding slipper slidably mounted in said slot and engaging said end surface.

10. A brake shoe anchor comprising a plurality of laminations, one of said laminations being shorter than the adjacent lamination to provide a slot, a sliding slipper slidably mounted in said slot, a cut-out portion in one of said adjacent laminations over said slot, and means engaging said sliding slipper and said cut out portion limiting the sliding movement of said slipper in said slot.

11. A brake shoe anchor comprising a plurality of laminations, one of said laminations being shorter that the adjacent lamination to provide a slot, the end of said short lamination being flat to provide a bearing surface, one of said adjacent laminations having a shoulder parallel to said flat bearing surface, and a sliding slipper in said slot having an enlarged guide portion engaging said shoulder and a base engaging said bearing surface.

12. A brake shoe anchor comprising a plurality of laminations, one of said laminations being shorter than the adjacent lamination to provide a slot, a sliding slipper slidably mounted in said slot, an aperture in a lamination adjacent said slot, and facing said slot, and spring means in said aperture engaging said sliding slipper.

13. A brake shoe anchor comprising a plurality of laminations secured to each other in fixed relation, one of said intermediate laminations being shorter than the adjacent laminations to provide a slot, the end of said short lamination within said slot being flat to provide a flat bearing surface, a sliding slipper in said slot having a base contacting said bearing surface for sliding movement parallel to said bearing surface, and interengaging means connecting said sliding slipper and one of said laminations to limit said sliding movement.

14. A brake shoe anchor comprising a plurality of laminations secured to each other in fixed relation, one of said laminations being shorter than the adjacent laminations to provide a slot, the end of said short lamination within said slot being flat to provide a flat bearing surface, a sliding slipper in said slot having a base contacting said bearing surface for sliding movement parallel to said bearing surface, and interengaging means connecting said sliding slipper and one of said laminations to maintain said slipper in sliding contact with said bearing surface.

15. A brake shoe anchor comprising a plurality of laminations, said laminations being rigidly secured together with the faces in contact, one of said laminations being shorter than the adjacent laminations to provide a slot, a sliding slipper slidably mounted in said slot and interengaging friction means engaging said slipper and one of said laminations to frictionally retain said slipper in said slot.

16. A brake comprising brake shoes arranged with the opposed ends facing each other, an anchor between said opposed ends, said anchor comprising a plurality of laminations rigidly secured together in face to face contact, one of said intermediate laminations having flat end surfaces and being smaller than the adjacent laminations to provide opposed angularly related slots with said end surfaces at the base of said slots, and means slidably mounted in said slots and engaging said end surfaces and pivotally engaging said opposed ends of said brake shoes.

17. A brake shoe anchor comprising a plurality of laminations, said laminations being rigidly secured together with the faces in contact, one of said laminations being shorter than the adjacent laminations to provide a slot, a sliding slipper slidably mounted in said slot and a spring engaging said slipper and one of said laminations to frictionally retain said slipper in said slot.

References Cited in the file of this patent

UNITED STATES PATENTS

| | | |
|---|---|---|
| 2,173,601 | White | Sept. 19, 1939 |
| 2,202,841 | Dick | June 4, 1940 |
| 2,288,146 | Sinclair | June 30, 1942 |
| 2,431,441 | Willis | Nov. 25, 1947 |

FOREIGN PATENTS

| | | |
|---|---|---|
| 487,316 | Great Britain | June 17, 1938 |
| 563,969 | Great Britain | Sept. 7, 1944 |